(12) United States Patent
Cash (10) Patent No.: US 11,499,715 B2
(45) Date of Patent: Nov. 15, 2022

(54) BIASED BURNER CONTROL FOR REGENERATIVE OXIDIZERS

(71) Applicant: DUSTEX LLC, Kennesaw, GA (US)

(72) Inventor: James T. Cash, Hackettstown, NJ (US)

(73) Assignee: DUSTEX, LLC, Kennesaw, GA (US)

( * ) Notice: Subject to any disclaimer, the term of this patent is extended or adjusted under 35 U.S.C. 154(b) by 334 days.

(21) Appl. No.: 16/709,769

(22) Filed: Dec. 10, 2019

(65) Prior Publication Data

US 2021/0172600 A1    Jun. 10, 2021

(51) Int. Cl.
*F23G 7/06* (2006.01)
*F23D 23/00* (2006.01)
*F23D 99/00* (2010.01)
*F23G 7/07* (2006.01)
*F23N 5/00* (2006.01)

(52) U.S. Cl.
CPC ............ *F23G 7/068* (2013.01); *F23D 23/00* (2013.01); *F23D 91/02* (2015.07); *F23G 7/07* (2013.01); *F23N 5/003* (2013.01); *F23D 2205/00* (2013.01); *F23G 2201/303* (2013.01); *F23G 2204/10* (2013.01); *F23G 2207/101* (2013.01)

(58) Field of Classification Search
CPC ...... F23D 2205/00; F23D 23/00; F23D 91/02; F23G 2204/10; F23G 2207/101; F23G 7/068; F23G 7/07; F23N 5/003
USPC .............................................................. 431/5
See application file for complete search history.

(56) References Cited

U.S. PATENT DOCUMENTS

| | | | |
|---|---|---|---|
| 5,620,668 A * | 4/1997 | Driscoll ................. | F23G 7/068 110/211 |
| 2016/0230091 A1* | 8/2016 | Bae ...................... | C09K 19/3003 |
| 2016/0348970 A1* | 12/2016 | Gangoli ................. | F23N 5/242 |

\* cited by examiner

*Primary Examiner* — Vivek K Shirsat
(74) *Attorney, Agent, or Firm* — Alston & Bird LLP (57) ABSTRACT

Methods and systems for oxidizing gas are provided. An example regenerative oxidizer is provided that includes a combustion chamber to heat gas present in the combustion chamber. The regenerative oxidizer also includes a first heat exchange media bed and a second heat exchange media bed. Each of the first heat exchange media bed and the second heat exchange media bed are in fluid communication with the combustion chamber. The regenerative oxidizer further includes two burners disposed within the combustion chamber to provide a total heat input to the gas present in the combustion chamber. At least one of the two burners is independently adjustable based on the airflow direction.

20 Claims, 10 Drawing Sheets

BIASED BURNER CONTROL FOR REGENERATIVE OXIDIZERS

FIELD OF THE INVENTION

The present disclosure relates generally to regenerative oxidizers (e.g., regenerative thermal oxidizers (RTOs) and/or regenerative catalytic oxidizers (RCOs)) and, more particularly, to methods, apparatuses, and systems for improving burner efficiency in regenerative oxidizers.

BACKGROUND

Regenerative thermal oxidizers (RTOs) are used to reduce the amount of pollutants, such as volatile organic compounds and odors, in gas through thermal oxidation. RTOs may include valve assemblies configured to alternate the flow of gas through the RTO during operation. Through applied effort, ingenuity, and innovation, many identified problems have been solved by developing solutions that are included in embodiments of the present disclosure, many examples of which are described in detail herein.

BRIEF SUMMARY

Various methods, apparatuses, and systems are included for independently controlling burners within a regenerative oxidizer. In an example embodiment, a regenerative oxidizer may be provided for oxidizing gas. The regenerative oxidizer may include a combustion chamber configured to heat gas present in the combustion chamber. The regenerative oxidizer may also include a first heat exchange media bed and a second heat exchange media bed. Each of the first heat exchange media bed and the second heat exchange media bed may be in fluid communication with the combustion chamber. A gas pathway may be defined by a flow of gas through the first heat exchange media bed and the second heat exchange media bed. A first airflow direction along the gas pathway may be defined in an instance in which an inlet feed of gas is provided to the first heat exchange media bed, and a second airflow direction along the gas pathway may be defined in an instance in which the inlet feed of gas is provided to the second heat exchange media bed. The regenerative oxidizer may further include two burners disposed within the combustion chamber configured to provide a total heat input to the gas present in the combustion chamber. At least one of the two burners is independently adjustable based on the airflow direction, such that a greater portion of the total heat input is directed to the first heat exchange media bed in an instance in which the gas is in the first airflow direction and a greater portion of the total heat input is directed to the second heat exchange media bed in an instance in which the gas is in the second airflow direction.

In some embodiments, the adjustment of the at least one burner may be responsive to a change in a measured characteristic of the gas in the combustion chamber. In some embodiments, the measured characteristic of the gas in the combustion chamber is temperature. In some embodiments, the two burners may include a first burner directing heat towards the first heat exchange media bed and a second burner directing heat towards the second heat exchange media bed. In some embodiments, the first burner may be configured to provide a first burner heat input and the second burner may be configured to provide a second burner heat input. In such an embodiment, the total heat input includes the first burner heat input and the second burner heat input. In some embodiments, in an instance in which airflow through the regenerative oxidizer is in the first airflow direction, the first burner heat input may be greater than the second burner heat input. In some embodiments, the first burner heat input and the second burner heat input may be determined based on a respective proximity of each of the two burners to the first heat exchange media bed. In some embodiments, in an instance in which airflow through the regenerative oxidizer is in the second airflow direction, the second burner heat input is greater than the first burner heat input. In some embodiments, the regenerative oxidizer may also include one or more additional burners disposed within the combustion chamber. In such an embodiment, the total heat input includes a first burner heat input, a second burner heat input, and a heat input from the one or more additional burners. In some embodiments, the regenerative oxidizer is a regenerative thermal oxidizer or a regenerative catalytic oxidizer.

In another embodiment, a method of operating a regenerative oxidizer for oxidizing gas is provided. The method may include providing a combustion chamber configured to heat gas present in the combustion chamber. The method may also include providing a first heat exchange media bed and a second heat exchange media bed. Each of the first heat exchange media bed and the second heat exchange media bed may be in fluid communication with the combustion chamber. The method may further include defining a gas pathway based on a flow of gas through the first heat exchange media bed and the second heat exchange media bed. The method may still further include defining a first airflow direction along the gas pathway in an instance in which an inlet feed of gas is provided to the first heat exchange media bed, and a second airflow direction along the gas pathway in an instance in which the inlet feed of gas is provided to the second heat exchange media bed. The method may also include independently adjusting at least one of two burners based on the airflow direction. Two burners are disposed within the combustion chamber configured to provide a total heat input to the gas present in the combustion chamber, such that a greater portion of the total heat input is directed to the first heat exchange media bed in an instance in which the gas is in the first airflow direction and a greater portion of the total heat input is directed to the second heat exchange media bed in an instance in which the gas is in the second airflow direction.

In some embodiments, the adjustment of at least one burner may be responsive to a change in a measured characteristic of the gas in the combustion chamber. In some embodiments, the measured characteristic of the gas in the combustion chamber is temperature. In some embodiments, the two burners may include a first burner directing heat towards the first heat exchange media bed and a second burner directing heat towards the second heat exchange media bed. In some embodiments, the first burner may be configured to provide a first burner heat input and the second burner may be configured to provide a second burner heat input. In such an embodiment, the total heat input includes the first burner heat input and the second burner heat input.

In some embodiments, in an instance in which airflow through the regenerative oxidizer is in the first airflow direction, the first burner heat input is greater than the second burner heat input. In some embodiments, the first burner heat input and the second burner heat input may be determined based on a respective proximity of each of the two burners to the first heat exchange media bed. In some embodiments, in an instance in which airflow through the regenerative oxidizer is in the second airflow direction, the second burner heat input is greater than the first burner heat input. In some embodiments, the method may also include disposing one or more additional burners within the combustion chamber. In such an embodiment, the total heat input includes a first burner heat input, a second burner heat input, and a heat input from the one or more additional burners. In some embodiments, the regenerative oxidizer is a regenerative thermal oxidizer or a regenerative catalytic oxidizer.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed lines for visibility of the underlying components.

The phrases "in an example embodiment," "some embodiments," "various embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that specific component or feature is not required to be included or to have the characteristic. Such component or feature may be optionally included in some embodiments, or it may be excluded. Throughout the present disclosure, the terms air and gas may be used interchangeably unless otherwise stated. Furthermore, as would be evident to one of ordinary skill in the art in light of the present disclosure, the terms "substantially" and "approximately" indicate that the referenced element or associated description is accurate to within applicable engineering tolerances. While various embodiments of the present disclosure discuss a regenerative thermal oxidizer, unless explicitly stated otherwise various other regenerative oxidizers, such as a regenerative catalytic oxidizer, may embody the various features discussed herein.

Regenerative Thermal Oxidizers (RTOs) are used in various operations, including manufacturing, to eliminate pollutants, such as volatile organic compounds (VOCs), hazardous air pollutants (HAPs), and odors, in gases before releasing the gases into the atmosphere. In order to do this, gases within the RTOs are heated to a sufficient temperature for the pollutants to oxidize and be destroyed, by turning the pollutants into water and carbon dioxide. Heating the gas to a sufficient temperature to oxidize the pollutants (e.g., over 1500 degrees Fahrenheit), may require a substantial amount of energy. RTOs, therefore, conserve energy by transferring heat to the gas at various points during operation to minimize heat lost by the system (e.g., to maximize heat within the system). To do this, RTOs may employ heat exchange elements of various shapes, materials, and configurations as well as alternating gas flow through the RTO to conserve energy within the system.

Gas entering the combustion chamber of an RTO, however, is at a temperature that is less than the temperature required (e.g., not sufficiently heated) for pollutants to oxidize. In various RTOs, burners are placed in the combustion chamber and provide additional heat needed to raise the temperature of the gas within the combustion chamber to a sufficient temperature for oxidation of any pollutants in the gas to occur. Given that during operation of the RTO the energy used by the burner(s) is effectively the only outside energy added to the system, increasing the energy efficiency of the burner(s) may increase the overall efficiency of the RTO.

Traditional RTOs may include various burner configurations used to raise the temperature of gas passing through a combustion chamber to a sufficient temperature in order for the pollutants in the gas to be oxidized and destroyed. Conventional RTOs may also employ a central burner or grouping of burners that provide a uniform heat input to the system. Said differently, each burner in the centrally located grouping may provide the same heat input into the system. Centrally positioned burners are, however, unable to provide targeted heat input to the gas. Furthermore, uniform heat distribution from the burners may result in heat escaping the system to adjacent heat exchange media beds, resulting in system inefficiencies. Given the change in airflow direction of the RTOs described hereafter, conventional center-mounted burner configurations also fail to provide for burner adaptability to efficiently accommodate heat input in response to a change in airflow direction. Centrally positioned burners may further result in flame impingement (e.g. physical contact between the flame produced by the burner and one of the heat exchange media beds) as the flame generated by the centrally positioned burners may drift into one of the heat exchange media beds with the flow of gas exiting the combustion chamber. As such, various embodiments described herein relate to methods, apparatuses, and systems for improving burner efficiency in an RTO by biasing the burner heat input.

At the typical operating temperatures of an RTO, most of the heat transfer from the burner flame to the process gas (e.g., the gas within the combustion chamber) is though convective heat transfer. Convective heat transfer refers to the transfer of heat to the gas moving through the combustion chamber as a result of the movement of these gases. The burner flame normally represents less than 5% of the total flow in the combustion chamber and time is necessary in order for the heat to be released from the burner and transferred completely and evenly into the process gas. The inventor has thus discovered that by providing heat to the gas as it enters the combustion chamber from the heat exchange media beds, the temperature of the gas may increase to the necessary temperature for combustion sooner than in RTOs with centrally located burners. For example, since most of the heat transfer in the combustion chamber is through convective transfer, the sooner the heat is introduced into the gas, the better the heat may be distributed. In various embodiments, moving the physical position of the burners from a central location, along with independently controlling the burners, allows for a reduction in flame impingement (e.g., localized hot spots) within the heat transfer media beds due to the burner location. For example, in an instance the burner is in a centralized location within the combustion chamber, the flame tends to drift with the flow of gas into the exiting heat transfer media bed causing flame impingement. In some embodiments, the reduction in flame impingement may increase the life of the heat exchange media beds. As described hereafter, embodiments of the present disclosure therefore allow for (1) more efficient heat distribution within the combustion chamber, (2) increased reliability of heat transfer media beds, and (3) increased energy efficiency as compared to conventional RTO configurations.

Figure 1:
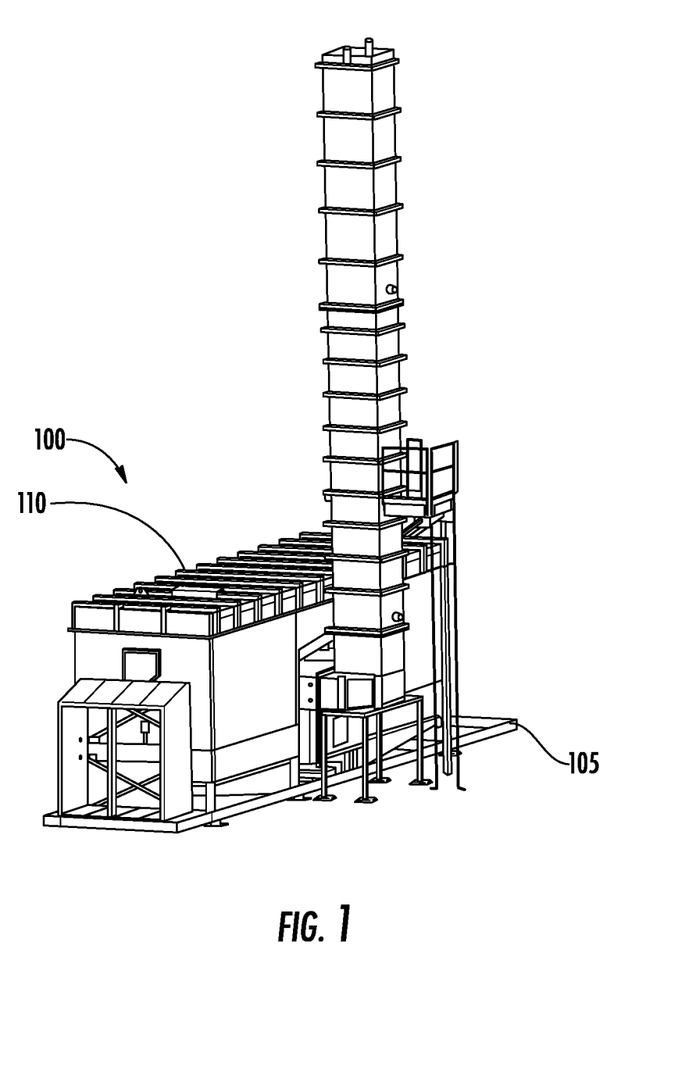
FIG. 1 illustrates a perspective exterior view of a two-can regenerative thermal oxidizer (RTO) in accordance with an example embodiment of the present disclosure.

With reference to FIG. 1, a two-can RTO 100 supported on a frame 105 is provided in accordance with an example embodiment of the present disclosure. While illustrated and described herein with reference to a two-can design, embodiments of the present disclosure may also be employed in various types of RTOs, including various other multi-can RTOs (e.g., three-can, five-can, seven-can, etc.) and rotary RTOs. As shown, the RTO 100 may include a housing 110 configured to contain, house, or otherwise support features used for sufficiently heating gas to oxidize pollutants as described hereafter with reference to FIGS. 2, 3A, and 3B.

Figure 2:
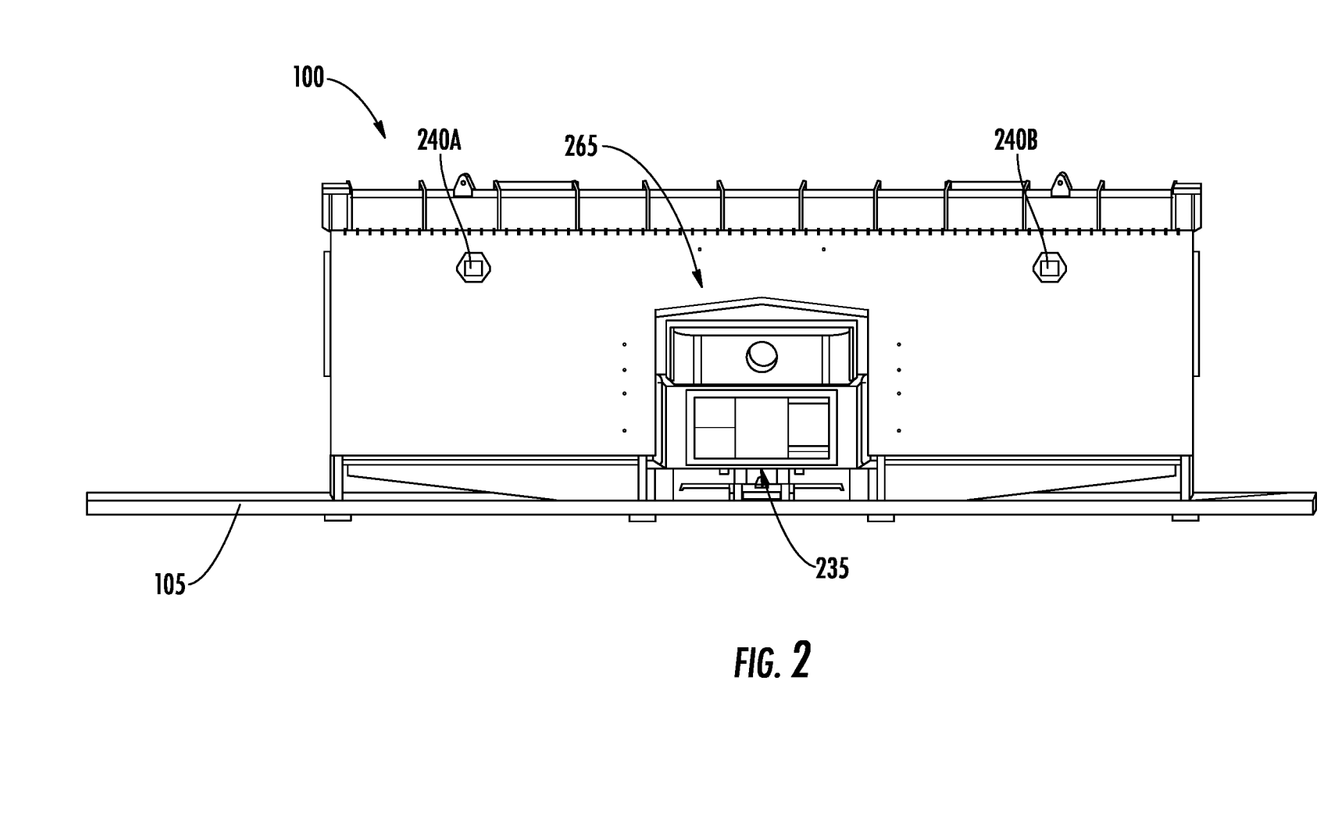
FIG. 2 illustrates a side view of the two-can RTO of FIG. 1 in accordance with an example embodiment of the present disclosure.
Figure 3A:
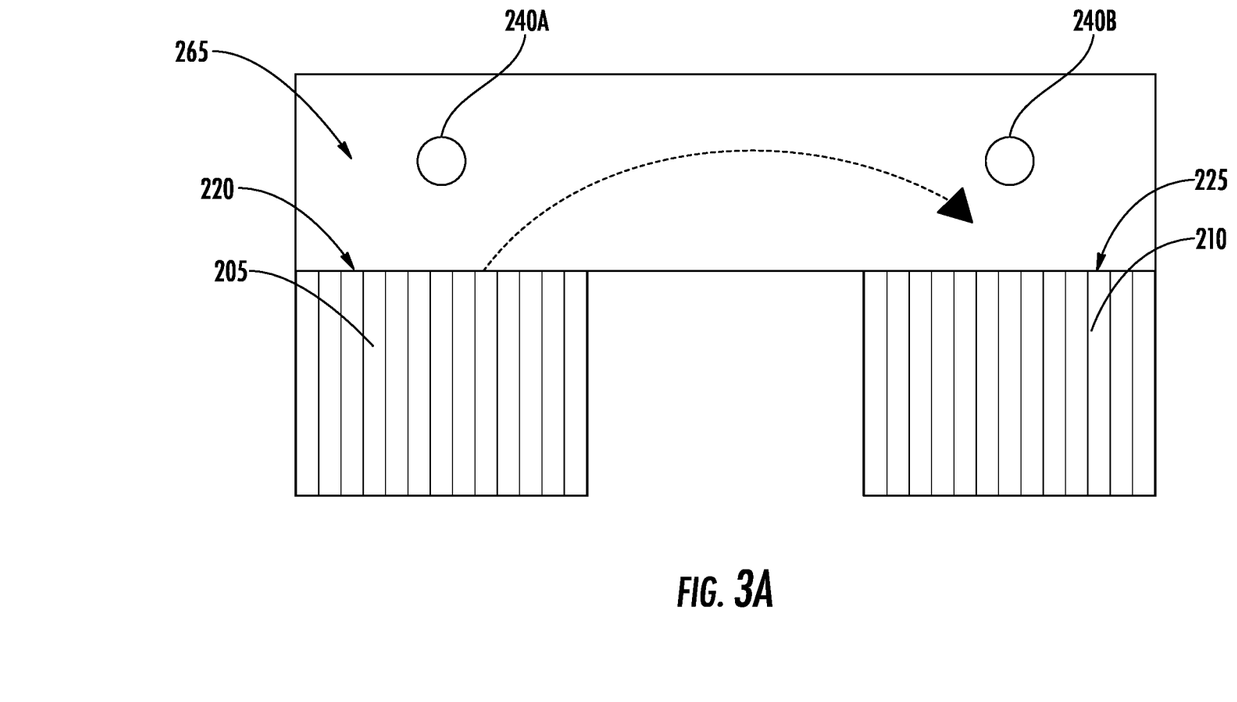
FIGS. 3A-3B illustrate a cross-section view of the two-can RTO of FIGS. 1-2 showing a first airflow direction and a second airflow direction in accordance with an example embodiment of the present disclosure.
Figure 3B:
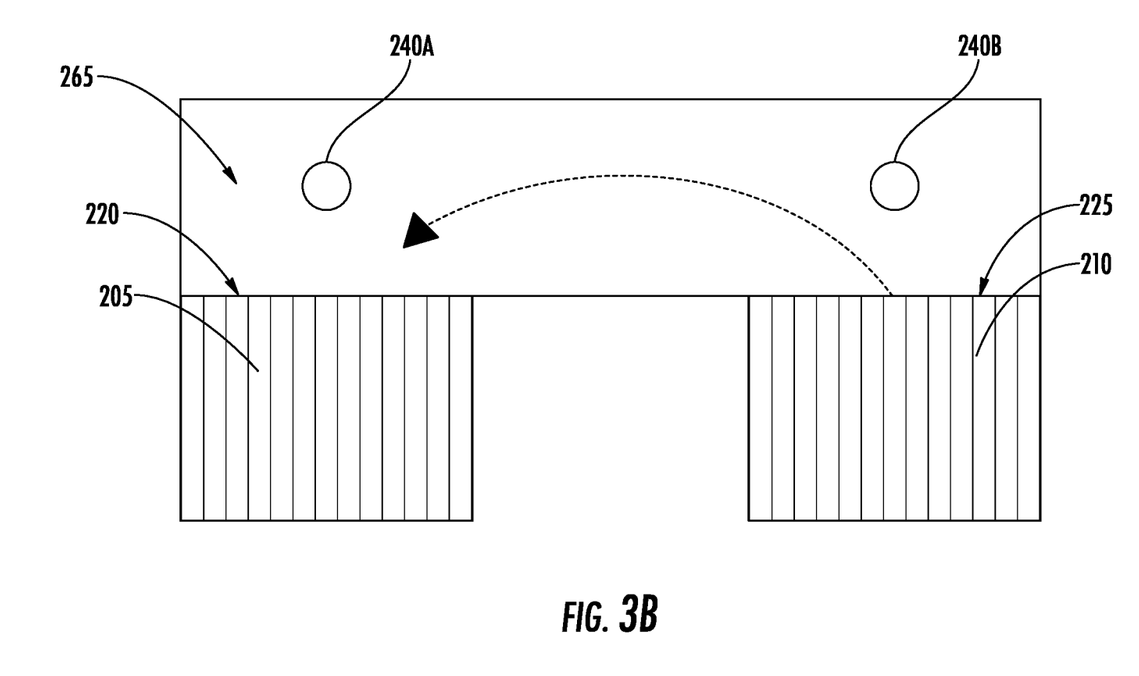

With reference to FIGS. 2, 3A, and 3B, the RTO 100 may include a combustion chamber 265 that defines a compartment within the housing 110 for the heating of gas passing therethrough. In an example embodiment, the RTO 100 may include a plurality of burners 240 (e.g., a first burner 240A and a second burner 240B) that may be disposed within the combustion chamber 265, and a combustion blower (not shown) supported on the frame 110 to supply combustion gas to the plurality of burners. Various embodiments of the present disclosure may be described in terms of a two-burner system. As would be evident to one skilled in the art in light of the present disclosure, additional burners (e.g., more than two (2) burners) may also be employed by the RTO 100 unless explicitly stated otherwise.

In some embodiments, as shown in FIG. 3A, the RTO 100 may include a first heat exchange media bed 205 in communication with the combustion chamber 265 at a first combustion chamber opening 220. Similarly, the RTO 100 may also include a second heat exchange media bed 210 in communication with the combustion chamber 265 at a second combustion chamber opening 225. In various embodiments, the combustion chamber 265 may define a compartment (e.g., an enclosure, a housing, etc.) within the housing 110. In some embodiments, the gas present in the combustion chamber 265 is heated by one or more burners 240 (e.g., a first burner 240A and a second burner 240B) and/or by the combustion of pollutants in the gas passing through the combustion chamber. By way of example, the gas flowing through the RTO 100 may enter the combustion chamber 265 (e.g., either from the first heat exchange media bed 205 or from the second heat exchange media bed 210) at a temperature near the combustion temperature of the pollutants in the gas. For example, the gas entering the combustion chamber 265 may be slightly below approximately 1500 degrees Fahrenheit (e.g., approximately 1400-1475 degrees Fahrenheit) after passing through one of the heat exchange media beds. In some embodiments, the gas may then need to be heated in the combustion chamber 265 to between approximately 1500 and approximately 1750 degrees Fahrenheit. In some embodiments, the combustion chamber 265 may have one or more burners 240 (e.g., a first burner 240A and/or a second burner 240B) configured to heat the gas in the combustion chamber. In some embodiments, the gas may, either additionally or alternatively, be heated by the combustion of other pollutants in the combustion chamber 265. For example, in an instance in which the gas contains a sufficient amount of pollutants, the combustion of the pollutants may in turn generate heat (e.g., through the resulting chemical reactions) that is sufficient to heat the gas to the required temperature without additional heat input from operation of the burner(s) 240 (e.g., the first burner 240A and/or the second burner 240B).

With continued reference to FIGS. 3A and 3B, the RTO 100 may employ two heat exchange media beds 205, 210 positioned at opposite ends of a combustion chamber 265 to conserve energy. In some embodiments, the heat exchange media beds 205 and 210 may be formed of a ceramic. Once the heat exchange media beds 205, 210 are initially heated, the gas flows through the heat exchange media bed with the higher relative temperature (e.g., the first heat exchange media bed 205), and the heat from the heat exchange media bed is transferred to the gas causing the gas to be heated before the gas enters the combustion chamber 265. For example, the gas may be heated to between approximately 1400 to approximately 1475 degrees Fahrenheit within the first heat exchange media bed 205.

Once in the combustion chamber 265, the gas is heated, by at least one of the two of burners 240 (e.g., the first burner 240A and/or the second burner 240B) and/or by the combustion of other pollutants, to a sufficient temperature to oxidize the pollutants present in the gas. In some embodiments, the gas may be heated to a temperature of approximately 1500 to approximately 1750 degrees Fahrenheit, at which point the pollutants in the gas are oxidized and destroyed. In an example embodiment, the heat provided by the burner(s) 240 (e.g., the first burner 240A and/or the second burner 240B) may be responsive to the temperature of the gas passing through the RTO 100 at a given time. For example, in an instance in which the gas is sufficiently warm (e.g., has a temperature that meets or exceeds the combustion temperature of the pollutants), the total heat input provided by the burners 240 (e.g., the first burner 240A and/or the second burner 240B) may be drastically reduced or eliminated (e.g., the first burner 240A and/or the second burner 240B may be inactive).

After moving through the combustion chamber 265, the gas enters another heat exchange media bed (e.g., the second heat exchange media bed 210), where the heat in the gas is transferred into the heat exchange media bed so as to conserve energy by retaining most of the heat within the RTO 100 to facilitate the processing of downstream gas flowing through the RTO. In some embodiments, the gas exiting the system is, as a result, cooled down to a temperature that is only 70 to 100 degrees above the temperature of the unprocessed gas entering the RTO 100. In some embodiments, in order to maintain the heat transfer between the gas and heat exchange media beds 205, 210, the flow of the gas through the RTO may be alternated (e.g., alternated at regular intervals of time). The flow of gas may be alternated as described in co-pending U.S. patent application Ser. No. 16/709,516 titled "Regenerative Oxidizer Arrangement."

In various embodiments, the term unprocessed gas refers only to gas that enters an RTO and is not a statement as to the level of pollutants in the unprocessed gas. For example, the unprocessed gas may have been previously processed by an RTO or pollution control system before entering the RTO 100. Additionally, the term processed gas refers to gas that exits the RTO 100 after traveling through and exiting the RTO 100 and is similarly not a statement as to the level of pollutants remaining in the gas, which may or may not undergo additional processing downstream.

In some embodiments, the alternation of the airflow direction through the RTO 100 allows for the RTO 100 to be self-sustaining with only minimal energy consumption by the burner(s) 240 (e.g., the first burner 240A and/or the second burner 240B) in the combustion chamber 265. For example, a reduction in the total heat input by the burners may result in a reduction in the energy consumption by the burners. In various embodiments described herein, the amount of heat provided by each burner 240 may be adjusted to maximize the efficiency of the system, such as in response to a change in the airflow direction of the gas through the RTO 100.

For example, in various embodiments, the unprocessed gas may enter the combustion chamber 265 (e.g., in a two-can system) via one of a first combustion chamber opening 220 or a second combustion chamber opening 225. The gas may further travel through the combustion chamber 265 before exiting via the other of the first combustion chamber opening 220 or the second combustion chamber opening 225. In various embodiments, the RTO 100 may include a gas pathway defined by a flow of gas through the first heat exchange media bed 205 and the second heat exchange media bed 210. During operation, the RTO 100 may alternate the flow of gas between a first airflow direction along the gas pathway defined in an instance in which an inlet feed of gas is provided to the first heat exchange media bed 205 and a second airflow direction along the gas pathway defined in an instance in which the inlet feed of gas is provided to the second heat exchange media bed 210.

Figure 3C:
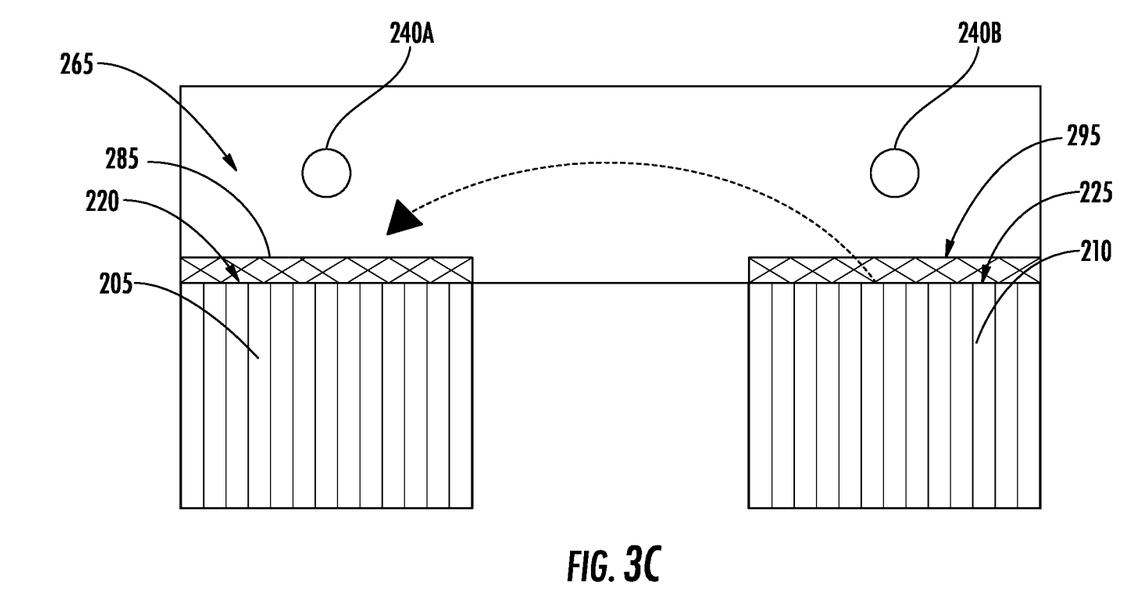
FIG. 3C illustrates a cross-section view of a two-can regenerative catalytic oxidizer in accordance with an example embodiment of the present disclosure.

In various embodiments, the regenerative oxidizer may be configured to operate as a regenerative catalytic oxidizer. As shown in FIG. 3C, one or both of the heat exchange media beds 205, 210 may also include catalytic heat exchange media 285, 295 located as a layer at or near the top of each heat exchange media bed 205, 210. In such an embodiment the combustion chamber 265 may operate at a significantly lower temperature than the regenerative thermal oxidizer. For example, the combustion chamber of a catalytic oxidizer may have a temperature of approximately 600 to approximately 1000 degrees Fahrenheit. In various embodiments, the outlet gas temperature of the catalytic oxidizer will be 25 to approximately 40 degrees Fahrenheit above the inlet gas temperature. The catalytic heat exchange media 285, 296 placed near the combustion chamber may help to oxidize any VOCs and/or HAPs via an exothermic reaction.

Figure 3D:
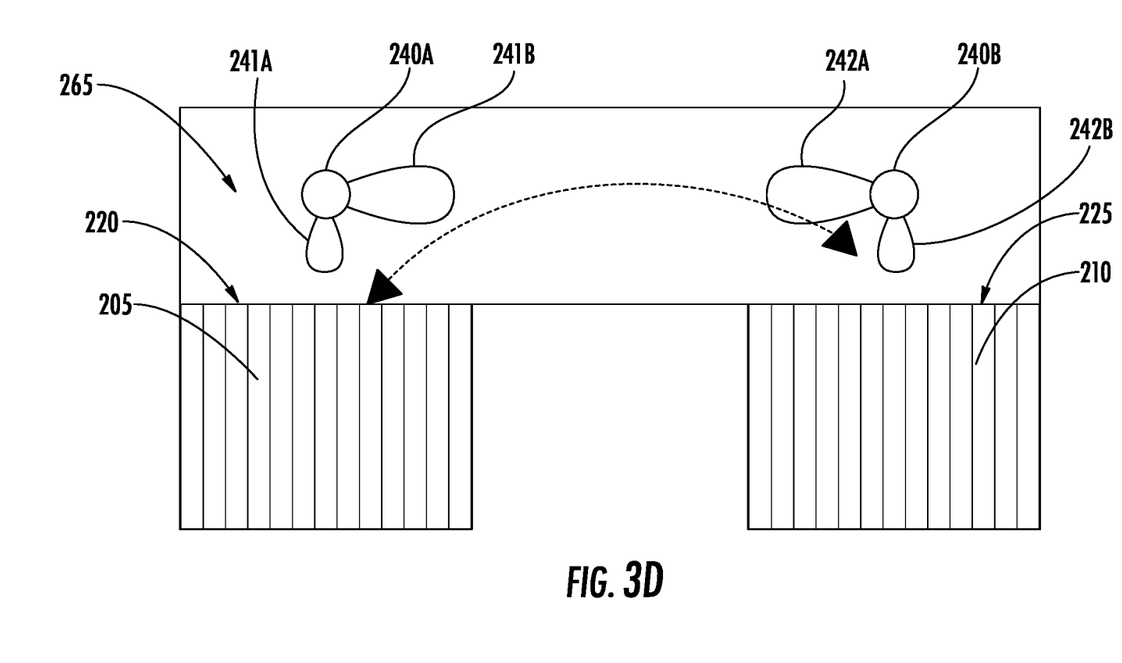
FIG. 3D illustrates a cross-section view of the two-can RTO of FIGS. 1-2 with the burners directed in different directions based on the airflow direction in accordance with an example embodiment of the present disclosure.

With continued reference to FIGS. 2, 3A, and 3B, the RTO 100 may include a plurality of burner(s) 240 (e.g., first burner 240A and second burner 240B) positioned at various locations within the combustion chamber 265. As shown, the RTO 100 may include two burners 240A, 240B disposed in the combustion chamber 265. In various embodiments, the burner(s) 240 (e.g., the first burner 240A and/or the second burner 240B) may be positioned at different locations within the combustion chamber 265 to maximize the effect of the heat input provided by one or both burners. For example, one or more of the burners 240 may be positioned proximate the first heat exchange media bed 205, and one or more other burners may be positioned proximate the second heat exchange media bed 210. As shown in FIG. 3D, the burners 240 may be configured such that the heat input provided by one or more of the burners may be directed or focused toward the first heat exchange media bed 205 or the second heat exchange media bed 210, regardless of a proximity of the burners to the first or second heat exchange media beds. In some embodiments, the burners 240 may be centrally disposed in the combustion chamber 265, but may be angled or otherwise configured to supply the heat input towards one of the heat exchange media beds more directly than the other heat exchange media bed.

In some embodiments, the burner(s) 240 may be independently controlled, such that one burner may supply a larger heat input relative to another burner. As described below with reference to FIG. 4, the total heat input provided by each burner 240 (e.g., the first burner 240A and the second burner 240B) may be responsive to (e.g., adjusted based on) the proximity of the respective burner to the combustion chamber opening via which the gas is inputted (e.g., the first combustion chamber opening 220 or the second combustion chamber opening 225). In other embodiments, the burner(s) 240 may be independently controlled, such that the burners 240 may direct a larger portion of the heat input towards one of the heat exchange media beds relative to the other. As such, the total heat input provided to each heat exchange media bed 205, 210 may be responsive to (e.g., adjusted based on) the configuration (e.g., position, angle, etc.) of the respective burner to the combustion chamber opening via which the gas is inputted (e.g., the first combustion chamber opening 220 or the second combustion chamber opening 225).

In some embodiments, the burners 240 may have their flames directed as shown in FIG. 3D. FIG. 3D illustrates the burners 240A, 240B directing flames in different directions based on the airflow direction of the gas passing through the combustion chamber. In various embodiments, the burner(s) farther away from the heat exchange media bed that is introducing gas into the combustion chamber 265 may direct at least a portion of the heat from said burner(s) towards the given heat exchange media bed. For example, in an instance in which the gas is in the first airflow direction, the second burner 240B may direct the flame towards the first heat exchange media bed 205 (e.g., flame 242A), while the first burner 240A may direct the flame also towards the first heat exchange media bed 205 (e.g., flame 241A) or in the general area of the gas entering the combustion chamber 265. Additionally or alternatively, in an instance in which the gas is travelling in the second airflow direction, the first burner 240A may direct the flame towards the second heat exchange media bed 210 (e.g., flame 242B), while the second burner 240B may direct the flame also towards the second heat exchange media bed 210 (e.g., flame 241B) or in the general area of the gas entering the combustion chamber 265. In this way, the burners 240A, 240B may (for example) be co-located, but their heat output may be focused towards the first or second heat exchange media bed 205, 210 so as to optimize the effect of the heat within the system. Even in cases in which the burners 240A, 240B are not co-located, the location of the burners need not necessarily coincide with the location of the first and second heat exchange media beds 205, 210 to concentrate the heat on the appropriate bed.

Figure 5A:
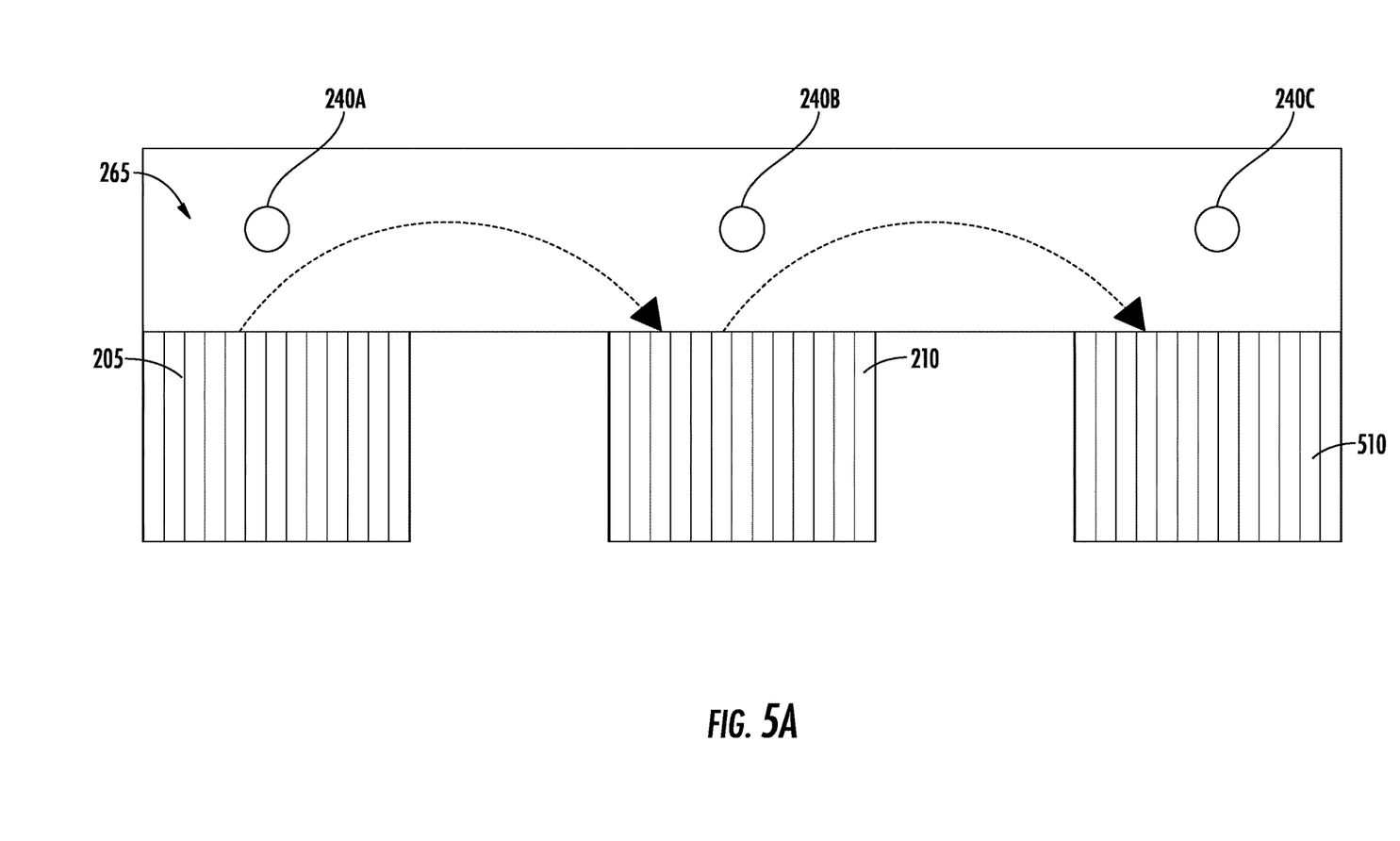
FIGS. 5A-5B are example burner configurations of a multi-can RTO and a rotary RTO in accordance with an example embodiment of the present disclosure.
Figure 5B:
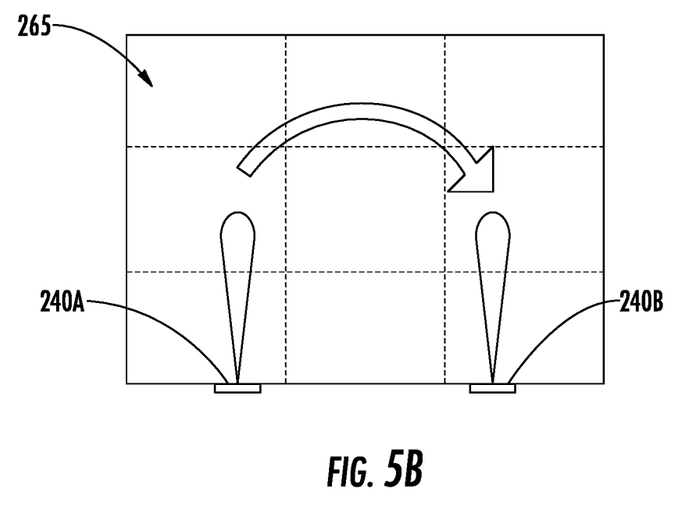

While illustrated herein with only two burners 240A, 240B, various embodiments of the present disclosure may include additional burners at other locations. For example, the combustion chamber 265 may include an additional burner disposed in the middle of the combustion chamber 265 between the first heat exchange media bed 205 and the second heat exchange media bed 210. Alternatively, in some embodiments, the combustion chamber 265 may have three (3) or more burners at varying positions within the combustion chamber 265 as shown in FIGS. 5A-5B. Additionally, as described above, various embodiments of the present disclosure may be used in other types of RTOs (e.g., multi-can RTOs and rotary RTOs), such that additional burners may be used.

In various embodiments, the plurality of burners may include a first burner 240A and a second burner 240B. In some embodiments, the first burner 240A may be positioned proximate (e.g., closer to) the first heat exchange media bed 205. Similarly, the second burner 240B may be positioned proximate (e.g., closer to) the second heat exchange media bed 210. In an example embodiment, the first burner 240A may be configured to provide a first burner heat input to the gas flowing through the combustion chamber 265, and the second burner 240B may be configured to provide a second burner heat input. In such an embodiment, the total heat input may include the first burner heat input and the second burner heat input. In various embodiments, the first burner heat input of the first burner 240A and the second burner heat input of the second burner 240B may be independently adjustable. As described hereafter with reference to FIG. 4, the independent adjustments of the first and second burner heat inputs may be responsive to (e.g., adjusted based on) at least one of (1) the airflow direction, (2) a change in airflow direction, or (3) a measured characteristic (e.g., temperature) within the combustion chamber. In various embodiments, the RTO 100 may include a controller (e.g., programmable logic controller) or the like for determining the total heat input of the burners that is needed as well as independently modifying the heat input provided by each burner to achieve the total heat input for obtaining a desired result (e.g., for combusting the pollutants within the gas). As described hereafter, the heat input provided by each burner may be modified or adjusted, in some embodiments, by adjusting the fuel supplied to the respective burner. In some embodiments, the fuel supplied to the respective burner may be adjusted using a control valve in communication with the respective burner. In other embodiments, the heat input provided to the respective heat exchange media bed may be modified or adjusted by directing the heat input from each burner more towards one of the heat exchange media beds than the other, such as via adjustment of the angle or orientation of the burner, such that although the heat outputted from a respective burner may remain constant, the heat reaching a particular heat exchange media bed may be increased or decreased, based on the particular adjustment made.

Figure 4:
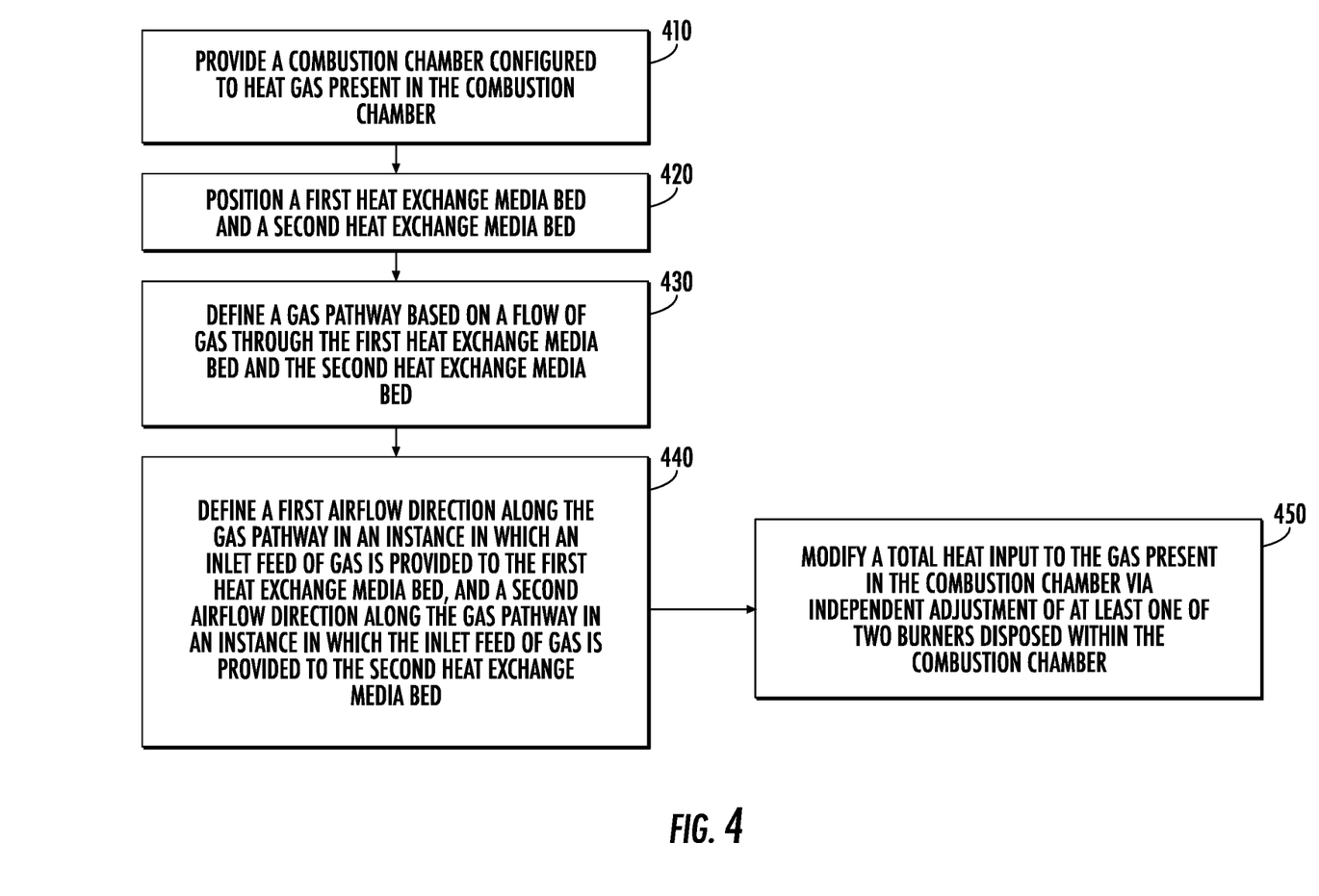
FIG. 4 illustrates a method of operation for an RTO in accordance with an example embodiment of the present disclosure.

Referring now to FIG. 4, a flowchart illustrating a method of operating an RTO is provided in accordance with an example embodiment of the present disclosure. Unless otherwise noted, the operations described herein may be accomplished using various embodiments described above. In particular, FIGS. 3A and 3B are referenced during the description of FIG. 4 and, as described above, illustrate a cross-sectional diagram of an RTO configured with an airflow in a first airflow direction (FIG. 3A) and in a second airflow direction (FIG. 3B).

The method may include providing a combustion chamber configured to heat gas present therein at Block 410. As described above, the combustion chamber 265 may define a compartment within the housing 110 for the heating of gas passing therethrough. In an example embodiment, the RTO 100 may include a plurality of burners 240 (e.g., a first burner 240A and a second burner 240B) that may be disposed within the combustion chamber 265. In various embodiments, the plurality of burners may be configured to provide a total heat input to the gas present in the combustion chamber 265.

The method may further include positioning a first heat exchange media bed and a second heat exchange media bed at Block 420. As described above, each of the first heat exchange media bed 205 and the second heat exchange media bed 210 may be in fluid communication with the combustion chamber 265. In various embodiments, the first heat exchange media bed 205 may be in communication with the combustion chamber 265 via a first combustion chamber opening 220 and the second heat exchange media bed 210 may be in communication with the combustion chamber 265 via a second combustion chamber opening 225.

As described above with reference to FIGS. 3A and 3B, the method may include positioning two heat exchange media beds 205, 210 at opposite ends of the combustion chamber 265 to conserve energy. Once the heat exchange media beds 205, 210 are initially heated, the gas flows through the heat exchange media bed with the higher relative temperature (e.g., the first heat exchange media bed 205), and the heat from the heat exchange media bed is transferred to the gas causing the gas to be heated before the gas enters the combustion chamber 265. For example, the gas may be heated to between approximately 1400 to approximately 1475 degrees Fahrenheit within the first heat exchange media bed 205. After travelling through the combustion chamber 265, the gas then enters the opposite heat exchange media bed (e.g., the second heat exchange media bed 210), where the heat in the gas is transferred into the heat exchange media bed to conserve the energy of the system. In some embodiments, the gas leaving the RTO may only be 20-30 degrees hotter than the gas entering the RTO based on the heat transfer with the heat exchange media bed. The method may also include defining a gas pathway based on a flow of gas through the first heat exchange media bed and the second heat exchange media bed at Block 430.

With continued reference to FIG. 4, the method includes defining a first airflow direction along the gas pathway in an instance in which an inlet feed of gas is provided to the first heat exchange media bed, and a second airflow direction along the gas pathway in an instance in which the inlet feed of gas is provided to the second heat exchange media bed at Block 440. In some embodiments, the first airflow direction along the gas pathway may be defined in an instance in which the inlet feed of gas is provided to the first heat exchange media bed 205 and flows through the combustion chamber 265 to the second heat exchange media bed 210. In some embodiments, the second airflow direction may be defined in an instance in which the inlet feed of gas is provided to the second heat exchange media bed 210 and flows through the combustion chamber 265 to the first heat exchange media bed 205.

In various embodiments, the RTO 100 may be configured to alternate the flow of gas between a first airflow direction (e.g., FIG. 3A) along the gas pathway and a second airflow direction (e.g., FIG. 3B) along the gas pathway. In particular, the RTO 100 may be continuously operated in order to conserve energy. As the gas enters the system during operation, the heat exchange media bed that first receives the inputted gas slowly loses heat to the gas (i.e., heat is transferred from the heat exchange media bed to the gas), while the other heat exchange media bed receives heat from the gas leaving the combustion chamber 265 (i.e., heat is transferred from the gas to the heat exchange media bed). In order for the system to operate effectively and conserve the heat within the RTO 100, the airflow direction may be alternated, such as based on the relative temperatures of the first and second heat exchange media beds 205, 210.

The method may further include modifying a total heat input to the gas present in the combustion chamber via independent adjustment of at least one of two burners disposed within the combustion chamber at Block 450. In some embodiments, the adjustment of at least one burner may be responsive to (e.g., adjusted based on) at least one of the airflow direction, a change in airflow direction, or a measured characteristic of the gas in the combustion chamber. For example, in an instance in which the airflow direction is changed from the first airflow direction to the second airflow direction, the first burner heat input may be reduced, and the second burner heat input may be increased. In an example embodiment, the first burner heat input and the second burner heat input may switch responsive to (e.g., adjusted based on) the change of the airflow direction (e.g., in an effort to maintain the total heat input the same). While described herein with reference to a change in airflow direction and/or change in a measured characteristic, such as temperature, the present disclosure contemplates that any characteristic (e.g., pressure, air volume, gas density, flow rate, etc.) may be monitored and/or analyzed in order to determine the necessary adjustment to one or more of the two burners.

As described above, the two burners may include a first burner 240A and a second burner 240B. In some embodiments, the first burner 240A may be disposed proximate the first heat exchange media bed and the second burner 240B may be disposed proximate the second heat exchange media bed. In some embodiments, the first burner 240A may be configured to provide a first burner heat input and the second burner 240B may be configured to provide a second burner heat input. As such, the total heat input may include the first burner heat input and the second burner heat input. In some embodiments, the first burner heat input and the second burner heat input are based on the respective proximity of each of the two burners to the first heat exchange media bed 205. For example, in an instance in which the gas travels in the first airflow direction (e.g., FIG. 3A), the first burner heat input may be greater than the second burner heat input (e.g., through configuration or adjustment of the first and second burners, respectively). Alternatively, in an instance in which the gas travels in the second airflow direction (e.g., FIG. 3B), the first burner heat input may be less than the second burner heat input. In some embodiments, in an instance in which the gas travels in the first airflow direction (e.g., FIG. 3A), first burner heat input and the second burner heat input may be at least partially directed towards the first heat exchange media bed 205, such that more of the total heat input is directed towards the first heat exchange media bed 205 than the second heat exchange media bed 210. Alternatively, in an instance in which the gas travels in the second airflow direction (e.g., FIG. 3B), the first burner heat input and the second burner heat input may be at least partially directed towards the second heat exchange media bed 210, such that more of the total heat input is directed towards the second heat exchange media bed 210 than the first heat exchange media bed 205. In some embodiments, one or more additional burners (not shown) may be disposed within the combustion chamber 265. In such an embodiment, the total heat input may include the first burner heat input, the second burner heat input, and a heat input from the one or more additional burners.

In some embodiments, the total heat input may be adjusted in response to a measured characteristic. In other embodiments, the total heat input may remain the same but the individual burner heat inputs may be adjusted in response to the measured characteristic. In some embodiments, the measured characteristic may include temperature. In an instance in which the temperature of the gas flowing through the combustion chamber 265 decreases, the total heat input may require adjustment via adjustment of at least one of the first burner heat input or the second burner heat input. As would be evident to one of ordinary skill in the art in light of the present disclosure, the RTO 100 may include one or more temperature sensors (e.g., thermometers or the like) positioned within the combustion chamber 265 so as to determine a temperature within the combustion chamber 265 at the location of the temperature sensors. Furthermore, the one or more temperature sensors may be positioned at any location within the combustion chamber 265 based upon the intended application of the RTO 100.

By way of example, the RTO 100 may be operating in a first airflow direction (e.g., FIG. 3A) in which gas enters through the inlet feed (not shown) and travels through the first heat exchange media bed 205 to be pre-heated prior to entering the combustion chamber 265. In some embodiments, a first burner 240A may be located proximate the first heat exchange media bed 205 and may be configured to provide a first burner heat input (e.g., a portion of the total heat input) that is greater than a second burner heat input (e.g., the remaining portion of the total heat input) provided by a second burner 240B located proximate the second heat exchange media bed 210. Upon a change in airflow direction (e.g., from the first airflow direction of FIG. 3A to the second airflow direction of FIG. 3B), however, the gas may enter through the inlet feed and travel through the second heat exchange media bed 210 to be heated prior to entering the combustion chamber 265. In order to adapt to the change in airflow direction, the second burner heat input provided by the second burner 240B located proximate the second heat exchange media bed 210 may be increased to be greater than the first burner heat input provided by the first burner 240A located proximate the first heat exchange media bed 205. In this way, the first burner 240A and the second burner 240B may be responsive to (e.g., independently adjustable to accommodate) the change in airflow direction. In some embodiments, in order to adapt to the change in airflow direction to the second airflow direction, the first burner heat input provided by the first burner 240A may be directed towards the second heat exchange media bed 210. In this way, the first burner 240A and the second burner 240B may be responsive to (e.g., independently adjustable to accommodate) the change in airflow direction.

In some embodiments, the total heat input may be adjusted based on the temperature of the gas within the combustion chamber 265. For example, in an instance in which the gas within the combustion chamber 265 is traveling in the first airflow direction and the temperature is below a target temperature (e.g., a temperature sufficient to destroy pollutants), the first burner heat input provided by the first burner 240A located proximate the first heat exchange media bed 205 may be increased. In particular, a temperature sensor (not shown) located proximate the first burner 240A and first heat exchange media bed 205 may determine that the temperature of the gas leaving entering the combustion chamber 265 fails to satisfy a target temperature (e.g., a threshold temperature). In response to this determination, the first burner heat input provided by the first burner 240A may be increased (e.g., via increased airflow, fuel supplied, etc. to the burner). Additionally, or alternatively, in an instance in which the gas within the combustion chamber 265 is traveling in the second airflow direction and the temperature is determined to be below a target temperature (e.g., a temperature sufficient to destroy pollutants), the second burner heat input provided by the second burner 240B located proximate the second heat exchange media bed 210 may be similarly increased. In various embodiments, the burner heat input for each burner may be independently adjusted by controlling the flow of burner fuel (e.g., natural gas). In some embodiments, the burner heat input for each burner may be independently adjusted by using a control valve in communication with the burner. For example, each burner may include an associated control valve that may proportionally control the amount of burner fuel (e.g., natural gas) that flows to the associated burner. Additionally, each burner may include a directing mechanism configured to adjust the direction in which the given heat input is being directed, as shown in FIG. 3D.

In some embodiments, one or more additional burners (e.g., in addition to the first burner 240A and the second burner 240B) may be disposed in the combustion chamber 265. In such embodiments, the total heat input may include the burner heat input of the additional burner(s) combined with the first burner heat input and the second burner heat input. In some embodiments, the additional burner(s) may also be independently adjustable. In other embodiments, one or more of the additional burner(s) may be configured to have the same burner heat input as one of the first burner 240A or second burner 240B. For example, one or more of the burners disposed in the combustion chamber may be grouped so as to be treated as a single burner for purposes of determining the burner heat input.

Referring now to FIGS. 5A and 5B, an example three-can RTO (FIG. 5A) and an example rotary RTO (FIG. 5B) are provided in accordance with an example embodiment of the present disclosure. As shown, the three-can RTO may include a first heat exchange media bed 205, a second heat exchange media bed 210, and a third heat exchange media bed 510 configured to operate similarly to the two-can RTO described above, such that the flow of gas is passed from one of the heat exchange media beds to another of the heat exchange media beds. In such an embodiment, the burner proximate to the heat exchange media bed through which the gas enters the combustion chamber 265 may be configured to provide a greater burner heat input than the other burners present in the combustion chamber 265. Said differently, the operations described above in reference to the two-can RTO 100 may be similarly applied to the three-can RTO and rotary RTO, respectively, of FIGS. 5A and 5B. Additionally, the combustion chamber 265 for a rotary RTO as shown in FIG. 5B may also include two (or more) burners 240A, 240B disposed within the combustion chamber 265. In some embodiments, as shown in FIG. 5A, one or more additional burners (e.g., a third burner 240C) may be disposed within the combustion chamber 265. As with a two-can RTO system, the burner located proximate (e.g., closer to) the heat exchange media bed from which gas enters the combustion chamber 265 may have a greater burner heat input than the other burner.

Figure 5C:
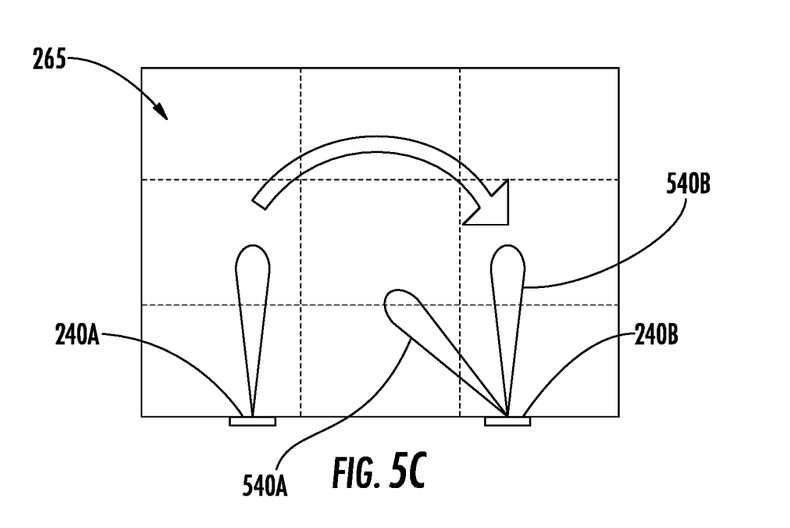
FIG. 5C is another example burner configuration of a rotary RTO in accordance with an example embodiment of the present disclosure.

FIG. 5C illustrates another example rotary RTO in accordance with an example embodiment of the present disclosure. As shown, the burner may be configured to direct heat (e.g., a flame) in a particular direction. For example, the second burner 240B may be located at a fixed point within the combustion chamber 265 away from where the gas is entering the combustion chamber, but second burner 240B may be configured to direct heat in the direction of the incoming airflow based on the airflow direction. For example, in an instance in which the gas is flowing in the first airflow direction, the second burner 240B may direct heat towards the first burner 240A and in an instance the gas is flowing in the second airflow direction, the first burner 240A may direct heat towards the second burner 240B. Additionally, the techniques described herein for directing heat from one or more burners may also be used in non-rotary regenerative oxidizers. For example, using the RTO shown in FIGS. 3A-3B, in an instance in which the gas is flowing in the first airflow direction (FIG. 3A) the second burner 240B may direct heat towards the first heat exchange media bed 205, and in an instance in which the gas is flowing in the second airflow direction (FIG. 3B) the first burner 240A may direct heat towards the second heat exchange media bed 210. In various embodiments, the term "direct" may refer to the direction in which the heat from a given burner (e.g., towards a given heat exchange media bed). As shown in FIG. 5C, the second burner 240B may be configured to adjust the direction of the burner between a first flame direction 540A and a second flame direction 540B, wherein the first flame 540A is defined as the direction of the second burner 240B flame in an instance in which the gas is in the first airflow direction and the second flame 540B is defined as the direction of the second burner 240B flame in an instance in which the gas is in the second airflow direction. Additionally, the first burner 240A and subsequent additional burners may also be configured to direct a flame in different directions based on the airflow direction. Various flame directing may occur in both rotary regenerative oxidizers and multi-can regenerative oxidizers.

In this way, the embodiments of the present disclosure improve the thermal efficiency of the burners operating in an RTO, reducing the amount of burner fuel needed, and increasing the durability of the ceramic heat exchange media beds during operation. In various embodiments, the operations described herein may allow for 1) better heat transfer to the incoming gas 2) a more even heat distribution in the combustion chamber than traditional configurations and 3) a reduction in the heat impingement on the heat exchange media beds due to the flow of gases through the RTO. Additionally, various embodiments of the biased burner control may be implemented in various types of RTOs including two-can RTOs, multi-can RTOs (3-can, 5-can, 7-can, etc.), and rotary RTOs while maintaining the benefits described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A regenerative oxidizer for oxidizing gas, the regenerative oxidizer comprising:
   a combustion chamber configured to heat gas present in the combustion chamber;
   a first heat exchange media bed and a second heat exchange media bed, wherein each of the first heat exchange media bed and the second heat exchange media bed are in fluid communication with the combustion chamber,
     wherein a gas pathway is defined by a flow of gas through the first heat exchange media bed and the second heat exchange media bed; and
     wherein a first airflow direction along the gas pathway is defined in an instance in which an inlet feed of gas is provided to the first heat exchange media bed, and a second airflow direction along the gas pathway is defined in an instance in which the inlet feed of gas is provided to the second heat exchange media bed; and
   two burners disposed within the combustion chamber configured to provide a total heat input to the gas present in the combustion chamber, wherein the total heat input provided by each burner defines a non-zero amount, wherein at least one of the two burners is independently adjustable based on the airflow direction, such that a greater portion of the total heat input is directed to the first heat exchange media bed in an instance in which the gas is in the first airflow direction and a greater portion of the total heat input is directed to the second heat exchange media bed in an instance in which the gas is in the second airflow direction.

2. The regenerative oxidizer of claim 1, wherein the adjustment of the at least one burner is responsive to a change in a measured characteristic of the gas in the combustion chamber.

3. The regenerative oxidizer of claim 2, wherein the measured characteristic of the gas in the combustion chamber is temperature.

4. The regenerative oxidizer of claim 1, wherein the two burners comprise a first burner directing heat towards the first heat exchange media bed and a second burner directing heat towards the second heat exchange media bed.

5. The regenerative oxidizer of claim 4, wherein the first burner is configured to provide a first burner heat input and the second burner is configured to provide a second burner heat input, wherein the total heat input comprises the first burner heat input and the second burner heat input.

6. The regenerative oxidizer of claim 5, wherein, in an instance in which airflow through the regenerative oxidizer is in the first airflow direction, the first burner heat input is greater than the second burner heat input.

7. The regenerative oxidizer of claim 5, wherein the first burner heat input and the second burner heat input are determined based on a respective proximity of each of the two burners to the first heat exchange media bed.

8. The regenerative oxidizer of claim 5, wherein, in an instance in which airflow through the regenerative oxidizer is in the second airflow direction, the second burner heat input is greater than the first burner heat input.

9. The regenerative oxidizer of claim 1, further comprising one or more additional burners disposed within the combustion chamber, wherein the total heat input comprises a first burner heat input, a second burner heat input, and a heat input from the one or more additional burners.

10. The regenerative oxidizer of claim 1, wherein the regenerative oxidizer is a regenerative thermal oxidizer or a regenerative catalytic oxidizer.

11. A method of operating a regenerative oxidizer for oxidizing gas, the method comprising:
   providing a combustion chamber configured to heat gas present in the combustion chamber;
   providing a first heat exchange media bed and a second heat exchange media bed, wherein each of the first heat exchange media bed and the second heat exchange media bed are in fluid communication with the combustion chamber;
   defining a gas pathway based on a flow of gas through the first heat exchange media bed and the second heat exchange media bed;
   defining a first airflow direction along the gas pathway in an instance in which an inlet feed of gas is provided to the first heat exchange media bed, and a second airflow direction along the gas pathway in an instance in which the inlet feed of gas is provided to the second heat exchange media bed; and
   independently adjusting at least one of two burners based on the airflow direction, wherein two burners are disposed within the combustion chamber configured to provide a total heat input to the gas present in the combustion chamber, wherein the total heat input provided by each burner defines a non-zero amount, such that a greater portion of the total heat input is directed to the first heat exchange media bed in an instance in which the gas is in the first airflow direction and a greater portion of the total heat input is directed to the second heat exchange media bed in an instance in which the gas is in the second airflow direction.

12. The method of claim 11, wherein the adjustment of the at least one burner is responsive to a change in a measured characteristic of the gas in the combustion chamber.

13. The method of claim 12, wherein the measured characteristic of the gas in the combustion chamber is temperature.

14. The method of claim 11, wherein the two burners comprise a first burner directing heat towards the first heat exchange media bed and a second burner directing heat towards proximate the second heat exchange media bed.

15. The method of claim 14, wherein the first burner is configured to provide a first burner heat input and the second burner is configured to provide a second burner heat input, wherein the total heat input comprises the first burner heat input and the second burner heat input.

16. The method of claim 15, wherein, in an instance in which airflow through the regenerative oxidizer is in the first airflow direction, the first burner heat input is greater than the second burner heat input.

17. The method of claim 15, wherein the first burner heat input and the second burner heat input are determined based on a respective proximity of each of the two burners to the first heat exchange media bed.

18. The method of claim 15, wherein, in an instance in which airflow through the regenerative oxidizer is in the second airflow direction, the second burner heat input is greater than the first burner heat input.

19. The method of claim 11, further comprising disposing one or more additional burners within the combustion chamber, wherein the total heat input comprises a first burner heat input, a second burner heat input, and a heat input from the one or more additional burners.

20. The method of claim 11, wherein the regenerative oxidizer is a regenerative thermal oxidizer or a regenerative catalytic oxidizer.

\* \* \* \* \*